(12) United States Patent
Sforzin et al.

(10) Patent No.: US 12,222,803 B2
(45) Date of Patent: Feb. 11, 2025

(54) INTRA-CONTROLLERS FOR ERROR CORRECTION CODE

(71) Applicant: Micron Technology, Inc., Boise, ID (US)

(72) Inventors: Marco Sforzin, Cernusco Sul Naviglio (IT); John D. Porter, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 57 days.

(21) Appl. No.: 18/216,254

(22) Filed: Jun. 29, 2023

(65) Prior Publication Data
US 2024/0004751 A1    Jan. 4, 2024

Related U.S. Application Data

(60) Provisional application No. 63/357,527, filed on Jun. 30, 2022.

(51) Int. Cl.
*G06F 11/10* (2006.01)

(52) U.S. Cl.
CPC .................... *G06F 11/10* (2013.01)

(58) Field of Classification Search
CPC ........ G06F 11/08; G06F 11/10; G06F 11/076; G06F 11/1016; G06F 11/106; G06F 11/1052; G06F 11/1004; G06F 11/1076; G06F 3/0659; G06F 3/0619; G06F 3/064; G11C 29/42; G11C 29/44; G11C 29/52

See application file for complete search history.

(56) References Cited

U.S. PATENT DOCUMENTS

| | | | |
|---|---|---|---|
| 8,495,467 B1 * | 7/2013 | Billing | G11C 29/44 714/764 |
| 11,687,273 B2 | 6/2023 | Confalonieri et al. | |
| 2015/0355964 A1 * | 12/2015 | Tsern | G06F 3/064 714/764 |
| 2021/0089395 A1 * | 3/2021 | Song | G06F 11/076 |
| 2023/0137339 A1 * | 5/2023 | Seo | G06F 3/0659 714/758 |

OTHER PUBLICATIONS

U.S. Appl. No. 17/831,433, filed Jun. 2, 2022, titled "Write Command Execution for Data Protection and Recovery Schemes", 42 pages.

* cited by examiner

*Primary Examiner* — Shelly A Chase

(74) *Attorney, Agent, or Firm* — Brooks, Cameron & Huebsch, PLLC

(57) ABSTRACT

An on-die controller can provide an error correction capability for data stored in an array of memory cells located on the same die as the on-die controller. The error correction capability provided by the on-die controller eliminates a need to transfer error correction code (ECC) data to an external controller that may have provided the error correction capability in lieu of the on-die controller, which can provide more channel bandwidth for other types of non-user data for further strengthening data reliability, security, integrity of the memory system.

20 Claims, 8 Drawing Sheets

INTRA-CONTROLLERS FOR ERROR CORRECTION CODE

PRIORITY INFORMATION

This application claims the benefit of U.S. Provisional Application No. 63/357,527, filed on Jun. 30, 2022, the contents of which are incorporated herein by reference.

TECHNICAL FIELD

The present disclosure relates generally to semiconductor memory and methods, and more particularly, to apparatuses, systems, and methods related to intra-controllers for error correction code (ECC).

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, ferroelectric random access memory (FeRAM), and resistance variable memory such as phase change random access memory (PCRAM), resistive random access memory (RRAM), and magnetoresistive random access memory (MRAM), such as spin torque transfer random access memory (STT RAM), among others.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system. A controller may be used to manage the transfer of data, commands, and/or instructions between the host and the memory devices.

DETAILED DESCRIPTION

Figure 1:
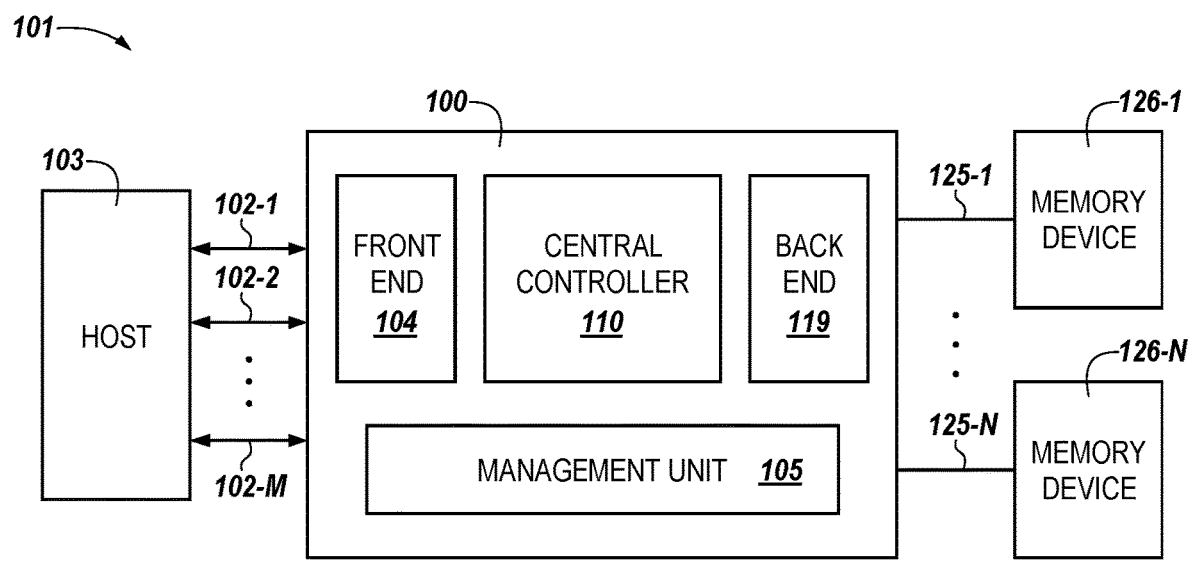
FIG. 1 is a functional block diagram of a computing system including a memory controller in accordance with a number of embodiments of the present disclosure.

Systems, apparatuses, and methods related to intra-controllers for error correction code (ECC) are described. Various embodiments of the present disclosure are directed to performing an error correction operation (alternatively referred to as "on-die ECC operation") at an on-die controller for data stored in an array of memory cells of the same die as the on-die controller, which can eliminate a need to transmit (e.g., transfer) error correction information (alternatively referred to as "on-die ECC bits") used for the on-die ECC operation out of a memory die. By eliminating a need to transmit the on-die ECC bits out of the memory die, a channel coupled to the memory die and used to transfer data out of the memory die can have more bandwidth for other types of auxiliary data (e.g., non-user data) that are dedicated for ensuring data reliability, security, integrity of the memory system during a predefined group of data transfers.

In some embodiments, an Extended Data Page (EDP) feature is utilized for transferring (e.g., exchanging) the auxiliary data to or from the array of the memory die, which allows substantially simultaneous data transfer of auxiliary data along with data transfers carried via data input/output (DQ) pins. As used herein, the term "substantially" means that the characteristic need not be absolute, but is close enough so as to achieve the advantages of the characteristic. For example, "substantially simultaneously" is not limited to operations that are performed absolutely simultaneously and can include timings that are intended to be simultaneously but due to manufacturing limitations may not be precisely simultaneously. As described above, a bandwidth of the EDP feature (e.g., an amount of bits the EDP feature can transfer over a particular burst length) spared from not transferring on-die ECC bits can be utilized for other types of auxiliary data, which can further strengthen the data reliability, security, integrity of the memory system as required by the memory system.

As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected. It is to be understood that data can be transferred, read, transmitted, received, or exchanged by electronic signals (e.g., current, voltage, etc.).

The figures herein follow a numbering convention in which the first digit or digits correspond to the drawing figure number and the remaining digits identify an element or component in the drawing. Similar elements or components between different figures may be identified by the use of similar digits. For example, 110 may reference element "10" in FIG. 1, and a similar element may be referenced as 210 in FIG. 2. Analogous elements within a Figure may be referenced with a hyphen and extra numeral or letter. See, for example, elements 102-1, 102-2, 102-M in FIG. 1. Such analogous elements may be generally referenced without the hyphen and extra numeral or letter. For example, elements 102-1, 102-2, 102-M may be collectively referenced as elements 102. As used herein, the designators "M" and "N", particularly with respect to reference numerals in the drawings, indicates that a number of the particular feature so designated can be included. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

FIG. 1 is a functional block diagram of a computing system 101 (alternatively referred to as "memory system") including a memory controller 100 in accordance with a number of embodiments of the present disclosure. The memory controller 100 can include a front end portion 104, a central controller portion 110, and a back end portion 119. The computing system 101 can include a host 103 and memory devices 126-1, . . . , 126-N coupled to the memory controller 100.

The front end portion 104 includes an interface and interface management circuitry to couple the memory controller 100 to the host 103 through input/output (I/O) lanes 102-1, 102-2, . . . , 102-M and circuitry to manage the I/O lanes 102. There can be any quantity of I/O lanes 102, such as eight, sixteen, or another quantity of I/O lanes 102. In some embodiments, the I/O lanes 102 can be configured as a single port.

In some embodiments, the memory controller 100 can be a compute express link (CXL) compliant memory controller. The host interface (e.g., the front end portion 104) can be managed with CXL protocols and be coupled to the host 103 via an interface configured for a peripheral component interconnect express (PCIe) protocol. CXL is a high-speed central processing unit (CPU)-to-device and CPU-to-memory interconnect designed to accelerate next-generation data center performance. CXL technology maintains memory coherency between the CPU memory space and memory on attached devices, which allows resource sharing for higher performance, reduced software stack complexity, and lower overall system cost. CXL is designed to be an industry open standard interface for high-speed communications, as accelerators are increasingly used to complement CPUs in support of emerging applications such as artificial intelligence and machine learning. CXL technology is built on the PCIe infrastructure, leveraging PCIe physical and electrical interfaces to provide advanced protocol in areas such as input/output (I/O) protocol, memory protocol (e.g., initially allowing a host to share memory with an accelerator), and coherency interface. As an example, the interface of the front end 104 can be a PCIe 5.0 or 6.0 interface coupled to the I/O lanes 102. In some embodiments, the memory controller 100 can receive access requests involving the memory device 126 via the PCIe 5.0 or 6.0 interface 206 according to a CXL protocol.

The central controller portion 110 can include and/or be referred to as data management circuitry. The central controller portion 110 can control, in response to receiving a request from the host 103, performance of a memory operation. Examples of the memory operation include a read operation to read data from a memory device 126 or a write operation to write data to a memory device 126.

The central controller portion 110 can generate error detection information and/or error recovery information based on data received from the host 103. The central controller portion 110 can perform error detection operations and/or error recovery operations on data received from the host 103 or from the memory devices 126. An example of an error detection operation is a cyclic redundancy check (CRC) operation. CRC may be referred to as algebraic error detection. CRC can include the use of a check value resulting from an algebraic calculation using the data to be protected. CRC can detect accidental changes to data by comparing a check value stored in association with the data to the check value calculated based on the data. An error correction operation (alternatively referred to as error correction code (ECC) operation) can be performed to correct an amount of bit errors and/or detect an amount of bit errors that may have not been corrected using the ECC operation. Error correction information used to perform the ECC operation can be parity data (alternatively referred to as "ECC bits" or "ECC data"), which are generated by comparing (e.g., XORing) user data (e.g., data received from the host 103) and encoding matrix. An error recovery operation (alternatively referred to as data recovery operation) can be performed to recover data from one or more memory dice (e.g., one or more memory dice 327-1, . . . , 327-4 or 427-1, . . . , 427-8) despite of its complete failure. The error recovery operation can include a chip kill operation.

A chip kill operation protects the memory system even if a constituent chip (e.g., the memory device 126) is damaged; thereby, avoiding a situation of one of the chips being a single point of failure (SPOF) of the memory system. Often, the chip kill capability is provided through various ECC schemes including a "Redundant Array of Independent Disks" (RAID) scheme, which allow data recovery of the damaged chip by reading all of the constituent chips of the memory system.

The chip kill can involve parity data (e.g., RAID parity) that are specifically designed for data recovery of the damaged chip. The RAID parity data can be generated by comparing (e.g., XORing) each subset of user data (e.g., subset of user data stored and/or to be stored in each memory die 327 and/or 427 illustrated in FIGS. 3 and 4, respectively). The user data that share the same parity data can be referred to as being grouped together.

The back end portion 119 can include a media controller and a physical (PHY) layer that couples the memory controller 100 to the memory devices 126. As used herein, the term "PHY layer" generally refers to the physical layer in the Open Systems Interconnection (OSI) model of a computing system. The PHY layer may be the first (e.g., lowest) layer of the OSI model and can be used transfer data over a physical data transmission medium. In some embodiments, the physical data transmission medium can include channels 125-1, . . . , 125-N. The channels 125 can include various types of data buses, such as a four-pin data bus (e.g., data input/output (DQ) bus) and a one-pin data mask inversion (DMI) bus, among other possible buses.

The memory devices 126 can be various/different types of memory devices. For instance, the memory device can include an array (e.g., an array of memory cells 220 illustrated in FIGS. 2A and 2B) RAM, ROM, DRAM, SDRAM, PCRAM, RRAM, and flash memory cells, among others. In embodiments in which the memory device 126 includes persistent or non-volatile memory, the memory device 126 can be flash memory devices such as NAND or NOR flash memory devices. Embodiments are not so limited, however, and the memory device 126 can include an array of other non-volatile memory cells such as non-volatile random-access memory cells (e.g., non-volatile RAM (NVRAM), ReRAM, ferroelectric RAM (FeRAM), MRAM, PCRAM), "emerging" memory cells such as a ferroelectric RAM cells that includes ferroelectric capacitors that can exhibit hysteresis characteristics, a memory device with resistive, phase-change, or similar memory cells, etc., or combinations thereof.

As an example, a FeRAM device (e.g., a memory device 126 include an array of FeRAM cells) can include ferroelectric capacitors and can perform bit storage based on an amount of voltage or charge applied thereto. In such examples, relatively small and relatively large voltages allow the ferroelectric RAM device to exhibit characteristics similar to normal dielectric materials (e.g., dielectric materials that have a relatively high dielectric constant) but at various voltages between such relatively small and large voltages the ferroelectric RAM device can exhibit a polarization reversal that yields non-linear dielectric behavior.

In another example, the memory devices 126 can be a dynamic random access memory (DRAM) device (e.g., the memory device 126 including an array of DRAM cells) operated according to a protocol such as low-power double data rate (LPDDRx), which may be referred to herein as LPDDRx DRAM devices, LPDDRx memory, etc. The "x" in LPDDRx refers to any of a number of generations of the protocol (e.g., LPDDR5). In at least one embodiment, at least one of the memory devices 126-1 is operated as an LPDDRx DRAM device with low-power features enabled and at least one of the memory devices 126-N is operated an LPDDRx DRAM device with at least one low-power feature disabled. In some embodiments, although the memory devices 126 are LPDDRx memory devices, the memory devices 126 do not include circuitry configured to provide low-power functionality for the memory devices 126 such as a dynamic voltage frequency scaling core (DVFSC), a sub-threshold current reduce circuit (SCRC), or other low-power functionality providing circuitry. Providing the LPDDRx memory devices 126 without such circuitry can advantageously reduce the cost, size, and/or complexity of the LPDDRx memory devices 126. By way of example, an LPDDRx memory device 126 with reduced low-power functionality providing circuitry can be used for applications other than mobile applications (e.g., if the memory is not intended to be used in a mobile application, some or all low-power functionality may be sacrificed for a reduction in the cost of producing the memory).

Data can be communicated between the back end portion 119 and the memory devices 126 primarily in forms of a memory transfer block (MTB) that includes a number of user data blocks (UDBs). As used herein, the term "MTB" refers to a group of UDBs that are grouped with a same parity data block (PDB) (e.g., share a same PDB); therefore, are transferred together from a cache (e.g., the cache 212) and/or memory devices 126 for each read or write command. For example, the group of UDBs of the same MTB can be transferred to/from (e.g., written to/read from) the memory devices 126 via the channels 125 over a predefined burst length (e.g., a 16-bit or 32-bit BL) that the memory controller 100 operates with.

A burst is a series of data transfers over multiple cycles, such as beats. As used herein, the term "beat" refers to a clock cycle increment during which an amount of data equal to the width of the memory bus may be transmitted. For example, 32-bit burst length can be made up of 32 beats of data transfers, while 16-bit burst length can be made up of 16 beats of data transfers. Although embodiments are not so limited, a bus width corresponding to a size of each beat can be 8 (e.g., alternatively referred to as "×8").

As used herein, the term "PDB" refers to a data block containing parity data (e.g., RAID parity) configured for a chip kill (e.g., RAID) operation on UDBs that are grouped with the PDB. As further described herein, an MTB can be in a plain text or cypher text form depending on whether the MTB has been encrypted at the memory controller 100 (e.g., the security encoder 217-1 and/or 217-1).

As used herein, the term "UDB" refers to a data block containing host data (e.g., received from the host 103 and alternatively referred to as "user data"). While an UDB can correspond to a size of a host read and/or write request, an MTB can be a unit of read and/or write access to the memory devices. Along with the MTB, a PDB can be also transferred between the back end portion 119 and the memory devices 126. The host data or the parity data of a single UDB or PDB can correspond to multiple codewords (e.g., 64 codewords).

Along with the UDB, other "extra" bits of data (e.g., other data in addition to data corresponding to an UDB and alternatively referred to as "auxiliary data") can also be transferred between the back end portion 119 and the memory devices 126. The extra data can include data used to correct and/or detect errors in UDB and/or authenticate and/or check data integrity of the UDB, and/or metadata, although embodiments are not so limited. Further details of the extra bits are illustrated and described in connection with FIGS. 2-4.

In some embodiments, some (e.g., one or more) memory devices 126 can be dedicated for PDBs. For example, memory devices configured to store UDBs can be different from a memory device (e.g., one or more memory devices) configured to store PDBs.

In some embodiments, the memory controller 100 can include a management unit 105 to initialize, configure, and/or monitor characteristics of the memory controller 100. The management unit 105 can include an I/O bus to manage out-of-band data and/or commands, a management unit controller to execute instructions associated with initializing, configuring, and/or monitoring the characteristics of the memory controller, and a management unit memory to store data associated with initializing, configuring, and/or monitoring the characteristics of the memory controller 100. As used herein, the term "out-of-band" generally refers to a transmission medium that is different from a primary transmission medium of a network. For example, out-of-band data and/or commands can be data and/or commands transferred to a network using a different transmission medium than the transmission medium used to transfer data within the network.

Figure 2A:
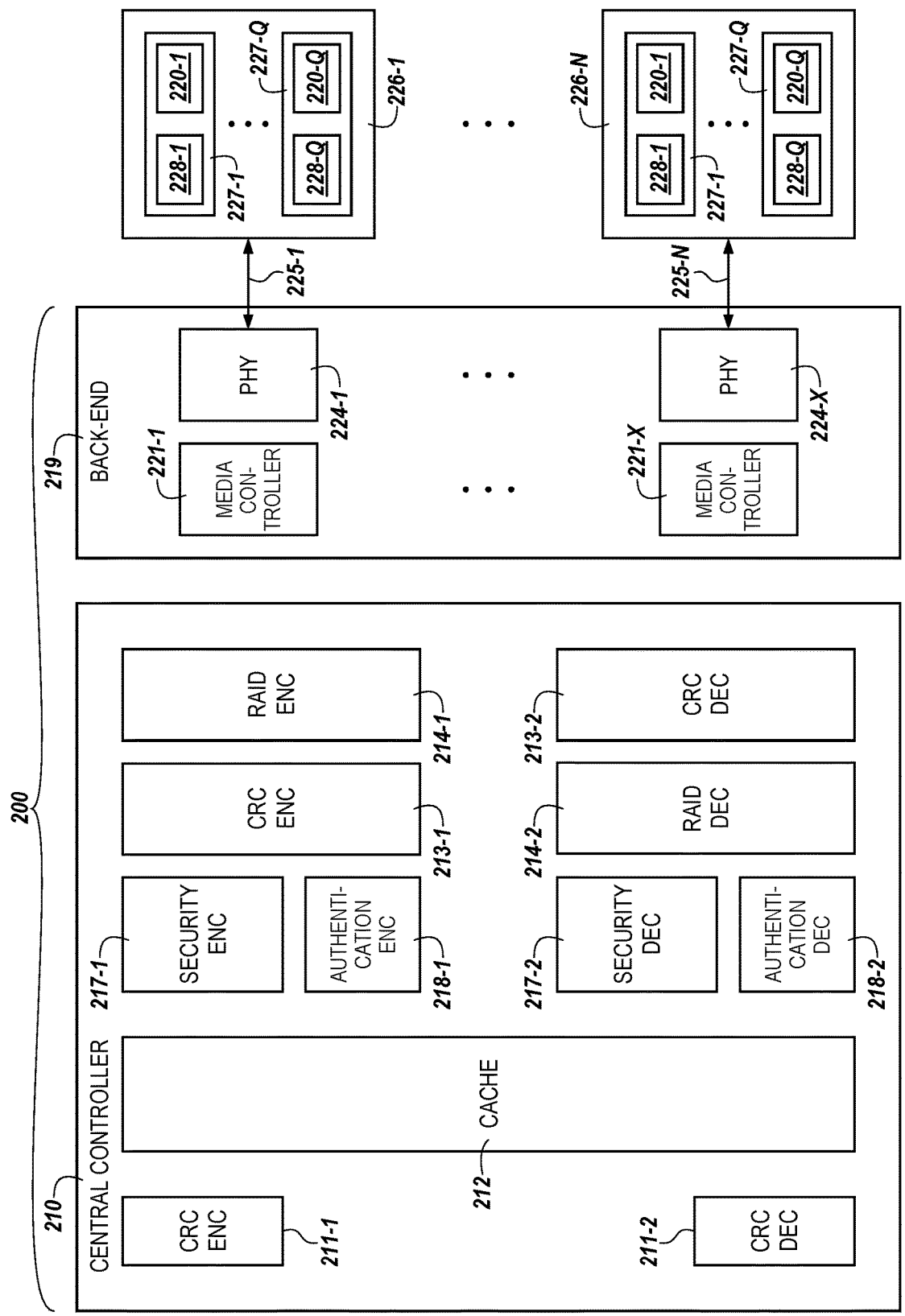
FIG. 2A is a functional block diagram of a memory controller having a redundant array of independent disks (RAID) encoder/decoder in accordance with a number of embodiments of the present disclosure.

FIG. 2A is a functional block diagram of a memory controller 200 for cache line data protection in accordance with a number of embodiments of the present disclosure. The memory controller 200, the central controller portion 210, the back end portion 219, and the memory devices 226 illustrated in FIG. 2A are analogous to the memory controller 100, the central controller portion 210, the back end portion 119, and the memory devices 126 illustrated in FIG. 1.

The central controller portion 210 includes a front-end CRC ("FCRC") encoder 211-1 (e.g., paired with a FCRC decoder 211-2) to generate error detection information (e.g., alternatively referred to as end-to-end CRC (e2e CRC))

based on data (e.g., an UDB in "plain text" form) received as a part of a write command (e.g., received from the host 103) and before writing the data to the cache 212. The error detection information generated at the FCRC encoder 211-1 can be a check value, such as CRC data. Read and write commands of CXL memory systems can be a size of UDB, such as 64 bytes. Accordingly, the data received at the FCRC encoder 211-1 can correspond to an UDB.

The central controller portion 210 includes a cache 212 to store data (e.g., user data), error detection information, error correction information, and/or metadata associated with performance of the memory operation. An example of the cache 212 is a thirty-two (32) way set-associative cache including multiple cache lines. While host read and write commands can be a size of an UDB (e.g., 64 bytes), the cache line size can be greater than a size of an UDB (e.g., equal to a size of multiple UDBs). For example, the cache line size can correspond to a size of two UDBs (with each UDB being a 64-byte chunk), such as 128 bytes.

These UDBs stored in each cache line (e.g., alternatively referred to as "UDBs corresponding to a cache line") can be a data transfer unit of data paths between the cache 212 and the memory devices 226. For example, even though a host read/write command is a size of an UDB, such as 64 bytes, the UDBs corresponding to a cache line can be collectively transferred between the cache 212 and the memory devices 226 (e.g., through other encoder/decoder illustrated in FIG. 2A) as a chunk. Therefore, the UDBs corresponding to a cache line can be collectively encrypted/decrypted at various encoder/decoders illustrated in FIG. 2A and located between the cache 212 and the memory devices 226. In some embodiments, these UDBs corresponding to a same cache line can also correspond to an MTB.

Data (e.g., UDBs) stored in (e.g., a respective cache line of) the cache 212 can be further transferred to the other components (e.g., a security encoder 217-1 and/or an authentication encoder 218-1) of the central controller portion 210 (e.g., as part of cache writing policies, such as cache writeback and/or cache writethrough) to be ultimately stored in the memory devices 226 to synchronizes the cache 212 and the memory devices 226 in the event that the data received from the host (e.g., the host 103 illustrated in FIG. 1) have not been written to the memory devices 226 yet.

Use of the cache 212 to store data associated with a read operation or a write operation can increase a speed and/or efficiency of accessing the data because the cache 212 can prefetch the data and store the data in multiple 64-byte blocks (e.g., 128 bytes) in the case of a cache miss. Instead of searching a separate memory device in the event of a cache miss, the data can be read from the cache 212. Less time and energy may be used accessing the prefetched data than would be used if the memory system has to search for the data before accessing the data.

The central controller portion 210 further includes a security encoder 217-1 (e.g., paired with a security decoder 217-2) to encrypt data (e.g., an MTB or UDBs corresponding to a cache line) before transferring the data to a CRC encoder 213-1 (to write the data to the memory devices 226). Although embodiments are not so limited, the pair of security encoder/decoder 217 can operate using an AES encryption/decryption (e.g., algorithm). Unencrypted data (e.g., plain text) can be converted to cypher text via encryption by the security encoder 217-1. The central controller portion 210 further includes an authentication encoder 218-1 to generate authentication data based on data received from the cache 212. Although embodiments are not so limited, the authentication data generated at the authentication encoder 218-1 can be MAC, such as KECCAK MAC (KMAC) (e.g., SHA-3-256 MAC).

In some embodiments, the MAC generated at the authentication encoder 218-1 can be calculated based on trusted execution environment (TEE) data (alternatively referred to as "TEE flag"), Host Physical Address (HPA) (e.g., a memory address used/identified by the host 103 illustrated in FIG. 1 in association with host read/write transactions), a security key identifier (ID) that are associated with a physical address (of the memory devices 226) to be accessed for executing a host write command.

The security encoder 217-1 and the authentication encoder 218-1 can operate in parallel. For example, the data stored in the cache 212 and that are in plain text form can be input (e.g., transferred) to both the security encoder 217-1 and the authentication encoder 218-1. In some embodiments, a security key ID can be further input (along with the data in plain text form) to the security encoder 217-1. Further, in some embodiments, a security key ID, TEE flag, and an HPA associated with a host write command can be further input (along with the data in plain text form) to the authentication encoder 218-1.

The central controller portion 210 includes a CRC encoder 213-1 (e.g., paired with a CRC decoder 213-2) to generate error detection information (e.g., alternatively referred to as CRC media (CRCm)) based collectively on UDBs corresponding to a cache line (e.g., on an MTB) received from the security encoder 217-1. The data transferred to the CRC encoder 213-1 from the security encoder 217-1 can be in cypher text form as the data were previously encrypted at the security encoder 217-1. The error detection information generated at the error detection information generator 213-1 can be a check value, such as CRC data. The CRC encoder 213-1 and CRC decoder 213-2 can operate on data having a size equal to or greater than a cache line size.

The central controller portion 210 includes RAID encoder 214-1 (e.g., paired with a RAID decoder 214-2) to generate and/or update RAID parity data (e.g., of a PDB) based at least in part on data (e.g., an MTB or one or more UDBs corresponding to a cache line) received from the CRC encoder 213-1. The data transferred to the RAID encoder 214-1 from the CRC encoder 213-1 can be in cypher text form as the data were encrypted at the security encoder 217-1.

In some embodiments, the RAID encoder 214-1 can further generate error correction information (e.g., different from RAID parity data) for correcting one or more bit errors and/or detecting an amount of errors exceeding a quantity of the one or more bit errors. While the RAID parity data can be used to recover entire bits of data stored in a memory die 227, the error correction information can be used to correct only a portion of the data stored in the memory die 227. Further details associated with the error correction information is described below in association with the RAID decoder 214-2).

The RAID encoder 214-1 can update the PDB to conform to new UDB received as part of a write command from the host. To update the PDB, an old UDB (that is to be replaced with the new UDB) and an old PDB (of a same stripe as the old UDB) can be read (e.g., transferred to the RAID encoder 214-1) and compared (e.g., XORed) with the new UDB, and a result of the comparison (e.g., the XOR operation) can be further compared (e.g., XORed) with an old PDB (that is to be updated) to result in a new (e.g., updated) PDB.

"Extra" bits of data (alternatively referred to as "auxiliary data") can be transferred (along with the UDBs) to the back end portion 219 to be ultimately transferred and written to the memory devices 226. The "extra" bits can include RAID parity data (e.g., in forms of a PDB) generated at the RAID 214-1, error detection information (e.g., CRC data) generated at the FCRC encoder 211-1 and/or 213-1, and/or authentication data (e.g., MAC data) generated at the authentication encoder 218-1 that are associated with the UDBs as well as metadata and/or TEE data.

As shown in FIG. 2A, the memory controller 200 can include a back end portion 219 coupled to the central controller portion 210. The back end portion 219 can include media controllers 221-1, ..., 221-X. The back end portion 219 can include PHY memory interfaces 224-1, ..., 224-X. Each physical interface 224 is configured to be coupled to a respective memory device 226.

The media controllers 221-1, ..., 221-X can be used substantially simultaneously to drive the channels 225-1, ..., 225-N simultaneously. In at least one embodiment, each of the media controllers 221 can receive a same command and address and drive the channels 225 substantially simultaneously. By using the same command and address, each of the media controllers 221 can utilize the channels 225 to perform the same memory operation on the same memory cells.

As used herein, the term "substantially" means that the characteristic need not be absolute, but is close enough so as to achieve the advantages of the characteristic. For example, "substantially simultaneously" is not limited to operations that are performed absolutely simultaneously and can include timings that are intended to be simultaneously but due to manufacturing limitations may not be precisely simultaneously. For example, due to read/write delays that may be exhibited by various interfaces (e.g., LPDDR5 vs. PCIe), media controllers that are utilized "substantially simultaneously" may not start or finish at exactly the same time. For example, the memory controllers can be utilized such that they are writing data to the memory devices at the same time regardless of whether one of the media controllers commences or terminates prior to the other.

The PHY memory interfaces 224 can be an LPDDRx memory interface. In some embodiments, each of the PHY memory interfaces 224 can include data and DMI pins. In an embodiment where there is a 1:1:1 correlation between the PHY memory interface, media controller 221 and the memory device 226 (or channel 226 alternatively), each PHY memory interface 224 can include sixteen DQ pins (DQ pins) and two DMI pins corresponding to a single memory device 126. In an alternative embodiment, each PHY memory interface 224 can collectively manage a number of memory devices 226 corresponding to a data protection channel (e.g., the RAID channel 329 and/or 429 illustrated in FIGS. 3 and 4, respectively), which can result in each PHY memory interface 224 including seventy-two DQ pins and 9 DMI pins (corresponding to nine memory devices 226) or each PHY memory interface 224 including eighty DQ pins and ten DMI pins (corresponding to ten memory devices 226). The media controllers 221 can be configured to exchange data with (e.g., memory dice 227 of) a respective memory device 226 via the data pins. The media controllers 221 can be configured to exchange error detection information, and or metadata via the DMI pins as opposed to exchanging such information via the data pins. The DMI pins can serve multiple functions, such as data mask, data bus inversion, and parity for read operations by setting a mode register. The DMI bus uses a bidirectional signal. In some instances, each transferred byte of data has a corresponding signal sent via the DMI pins for selection of the data. In at least one embodiment, the data can be exchanged simultaneously with the error correction information and/or the error detection information. For example, 128 bytes of data (e.g., an MTB or UDBs corresponding to a cache line) can be exchanged (transmitted or received) via the data pins while 128 bits of the extra bits are exchanged via the DMI pins. Such embodiments reduce what would otherwise be overhead on the data input/output (e.g., also referred to in the art as a "DQ") bus for transferring error correction information, error detection information, and/or metadata.

The back end portion 219 can couple the PHY memory interfaces 224-1, ..., 224-X to respective memory devices 226-1, ..., 226-N. The memory devices 226 each include at least one array of memory cells. In some embodiments, the memory devices 226 can be different types of memory. The media controllers 221 can be configured to control at least two different types of memory. For example, the memory device 226-1 can be LPDDRx memory operated according to a first protocol and the memory device 226-N can be LPDDRx memory operated according to a second protocol different from the first protocol. In such an example, the first media controller 221-1 can be configured to control a first subset of the memory devices 226-1 according to the first protocol and the second media controller 221-X can be configured to control a second subset of the memory devices 226-N according to the second protocol.

Each memory device 226 can include a number of memory dice 227-1, ..., 227-Q respectively including an array of memory cells 220-1, ..., 220-Q and intra-controllers 228-1, ..., 228-Q (alternatively referred to as "on-die controllers") that can be dedicated for respective memory dice (e.g., the memory dice 327 and/or 427 illustrated in FIGS. 3 and 4 respectively). Although embodiments are not so limited, the array of memory cells 220 can include FeRAM cells.

The intra-controller 228 can be an on-die controller that is configured to access the respective array of memory cells 220 on the same die (e.g., memory die 327 and/or 427 illustrated in FIGS. 3 and 4 respectively). Although not shown in FIG. 2A, so as to not obfuscate the drawings, the intra-controller 228 can include various circuitry to facilitate and/or orchestrate the operations described herein.

The intra-controller 228 can control performance of a memory operation associated with a respective memory die. Examples of the memory operation include a read operation to read data from (e.g., an array of memory cells of) a memory die 327, 427 or a write operation to write data to (e.g., an array of memory cells of) a memory die 327, 427.

The intra-controller 228 can further provide an error correction capability. For example, upon data (e.g., a portion (subset) of UDB) being transferred to and received at the memory die 227, the respective intra-controller 228 can generate error correction information (alternatively referred to as "on-die ECC data") based on the data, store the error correction information in the respective array 220 on the same memory die 227, and perform (using the on-die ECC data) an error correction operation (alternatively referred to as "on-die ECC operation) prior to transferring the data back to the memory controller 200.

The on-die ECC data can be used to correct a single error (without detecting errors), which is referred to as a single error correction (SEC) operation, to correct a single error or detect two errors (without correcting two errors), which is referred to as a single error correction and double error detection (SECDED) operation, or to correct a two error or detect three errors (without correcting three errors), which is referred to as a double error correction and triple error detection (DECTED) operation, although embodiments are not so limited. A result of the error correction operation performed at each intra-controller 228 can be reported to the memory controller 200 (e.g., such as a respective media controller 221). For example, the result can indicate whether any bit errors have been corrected (single or double bit errors) or whether there were any amount of bit errors (single or double bit errors) uncorrectable despite of the error correction operation being performed.

Data (an MTB or UDBs corresponding to a cache line) stored in the memory devices 226 can be transferred to the back end portion 219 to be ultimately transferred and written to the cache 212 and/or transferred to the host (e.g., the host 103 illustrated in FIG. 1). In some embodiments, the data are transferred in response to a read command to access a subset of the data (e.g., one UDB) and/or to synchronize the cache 212 and the memory devices 226 to clean up "dirty" data in the cache 212.

Along with the UDBs, other "extra" bits of data (alternatively referred to as "auxiliary data") can be transferred to the back end portion 219 as well. The "extra" bits can include RAID parity data generated at the RAID encoder 214-1 (e.g., in forms of a PDB), error detection information generated at the FCRC encoder 211-1 and/or 213-1, parity data (e.g., RAID parity data) generated at the RAID encoder 214-1, and authentication data generated at the authentication encoder 218-1 that are associated with the UDBs as well as metadata and/or TEE data. In some embodiments, the "extra" bits can further include error correction information generated at the RAID encoder 214-1. As described herein, the UDBs transferred to the back end portion 219 can be in cypher text form.

Data (e.g., an MTB or UDBs corresponding to a cache line) transferred to the back end portion 219 from the memory devices 226 can be further transferred to the CRC decoder 213-2 along with at least the error detection information previously generated at the CRC encoder 213-1. At the CRC decoder 213-2, an error detection operation can be performed to detect any errors in the UDBs using the error detection information, such as CRC data.

The CRC decoder 213-2 can further operate on data in conjunction with the RAID decoder 214-2 to provide check-and-recover correction. More specifically, the CRC decoder 213-2 can detect an error in data transferred from the memory devices 226 and the RAID decoder 214-2 can correct and/or recover the data in response in various manners.

The RAID decoder 214-2 can provide an error correction capability (e.g., by performing an ECC operation) as well as data recover capability (e.g., by performing a RAID operation). In one embodiment, the RAID decoder 214-2 can operate the CRC decoder 213-2 collaboratively with the intra-controllers 228 to implement a "retry mechanism". For example, if the CRC decoder 213-2 indicates one or more bit errors on the MTB, the RAID decoder 214-2 can cause (e.g., the respective media controller 221 coupled to) the memory device 226 to retry the transmission (e.g., retransfer) of the respective subset for a number of times (e.g., three times). Using copies of MTB transferred over the number of retransfers, the RAID decoder 214-2 can utilize a "voting mechanism" to correct the amount of bit errors. For example, the RAID decoder 214-2 can determine whether there is a match on data patterns (of the copies) by a majority of the copies and transfer (e.g., to the CRC decoder of the RAID decoder 214-2) the MTB having a data pattern corresponding to the majority match.

If an error persists (as indicated by a CRC decoder within the RAID decoder 214-2) that was not correctable by the ECC operation and/or retry mechanism performed by the RAID decoder 214-2, the RAID decoder 214-2 can trigger a RAID process. When the RAID process is triggered, the RAID operation performed on the UDB can recover a subset of the UDB that was transferred from one (e.g., failed) memory die based on the other subsets of the UDB transferred from the other memory dice. Since all the subsets (of the UDB) is collectively input (e.g., transferred) to the CRC decoder (e.g., the CRC decoder 213-2 illustrated in FIG. 2A) and collectively checked for one or more errors (alternatively referred to as "locked-RAID"), the CRC check performed at the CRC decoder may not indicate which subset has one or more errors. Therefore, the triggered RAID process involves a number of RAID operations that can be respectively and independently performed on each subset to correct the one subset that indeed has the errors. For example, considering an UDB is received from four memory dice (e.g., the memory dice 327-1 to 327-4 illustrated in FIG. 3A), four RAID operations can be performed respectively on each subset (e.g., subsets 354-1, . . . , 354-4 illustrated in FIG. 3B) of the UDB. Alternatively, considering an UDB is received from eight memory dice (e.g., the memory dice 427-1 to 427-8 illustrated in FIG. 4A), eight RAID operations can be performed respectively on each subset (e.g., subsets 454-1, . . . , 455-8 illustrated in FIG. 4B) of the UDB.

In some embodiments, the RAID decoder 214-2 can further include a CRC decoder that provides the same functionality as the CRC decoder 213-2, but to perform an error detection operation (e.g., to CRC-check) on data subsequent to the RAID operations. Continuing with the above example, the CRC check can be performed using the CRC decoder within the RAID decoder 214-2 on results of the eight RAID operations to determine which one of the RAID operations actually corrected the errors (instead of correcting the subset that didn't trigger the RAID process). One of the results (e.g., UDB with the errors corrected properly) can be further sent to the security decoder 217 and/or authentication decoder 218.

In some embodiments, the RAID decoder 214-2 can perform a respective error correction operation (e.g., link ECC operation) on each subset (e.g., a subset 331 and/or 431 illustrated in FIGS. 3 and 4, respectively) of one or more UDBs and/or PDBs received from the memory devices 226 using error correction information (alternatively referred to as "link ECC data") that was previously generated at the RAID encoder 214-1. The error correction operation performed on the respective subset can be a SEC operation, a SECDED operation, or a DECTED operation, although embodiments are not so limited. The link ECC operation is performed to avoid errors (e.g., random errors) that would have been occurred over channels (such as channels 225 and alternatively referred as "links"). The retry mechanism can be selectively enabled or disabled.

The data (e.g., an MTB or UDBs corresponding to a cache line) can be further transferred to the security decoder 217-2 and to the authentication decoder 218-2 along with at least the authentication data previously generated at the authentication encoder 218-1. At the security decoder 217-2, the data can be decrypted (e.g., converted from the cypher text back to the plain text as originally received from the host). The security decoder 217-2 can use an AES decryption to decrypt the data.

At the authentication decoder 218-2, the data that were decrypted at the security decoder 217-2 can be authenticated (and/or checked for data integrity) using the authentication data (e.g., MAC data) that were previously generated at the authentication encoder 218-1. In some embodiments, the authentication decoder 218-2 can calculate MAC based on TEE data, HPA, and the security key ID associated with a physical address to be accessed for executing a host read command. The MAC that is calculated during the read operation can be compared to the MAC transferred from (a location corresponding to the physical address of) the memory devices 226. If the calculated MAC and transferred MAC match, the UDBs are written to the cache 212 (and further transferred to the host if needed). If the calculated MAC and transferred MAC do not match, the host is notified of the mismatch (and/or the poison).

The data (e.g., an MTB or UDBs corresponding to a cache line) authenticated (and/or checked for data integrity) at the authentication decoder 218-2 can be transferred and written to the cache 212. In some embodiments, data can be further transferred from the cache 212 to the FCRC decoder 211-2, for example, in response to a read command received from the host (e.g., the host 103 illustrated in FIG. 1). As described herein, host read and write commands of CXL memory systems can be a size of UDB, such as 64 bytes. For example, data can be requested by the host in a granularity of an UDB. In this example, even if data transferred from the memory devices 226 are multiple UDBs (corresponding to a cache line), data can be transferred from the cache 212 to the host in a granularity of an UDB. At the FCRC decoder 211-2, data (e.g., an UDB requested by the host) can be checked (CRC-checked) for any errors using CRC data that were previously generated at the FCRC encoder 211-1. The data decrypted at the FCRC decoder 211-2 can be further transferred to the host.

Figure 2B:
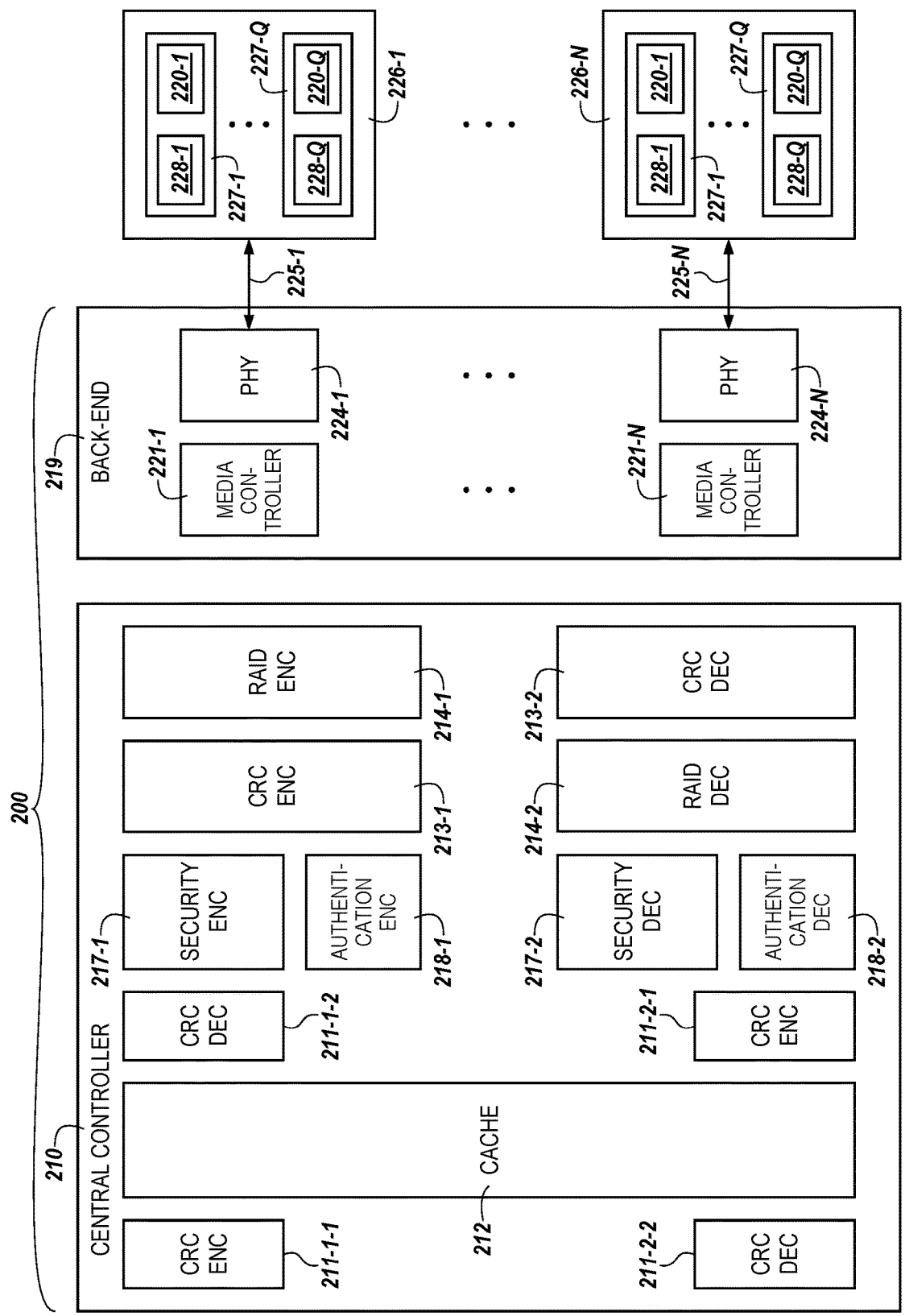
FIG. 2B is another functional block diagram of a memory controller having a RAID encoder/decoder in accordance with a number of embodiments of the present disclosure.

FIG. 2B is another functional block diagram of a memory controller 200 for cache line data protection in accordance with a number of embodiments of the present disclosure. The memory controller 200, the central controller portion 210, the back end portion 219, and the memory devices 226 illustrated in FIG. 2B are analogous to the memory controller 100, the central controller portion 110, the back end portion 119, and the memory devices 126 illustrated in FIG. 1.

The memory controller 200 can include a central controller portion 210, and a back end portion 219. The central controller portion 210 can include a front-end CRC ("FCRC") encoder 211-1-1 paired with a FCRC decoder 211-2 and a FCRC encoder 211-2-1 paired with a FCRC decoder 211-2-1, the cache memory 212 coupled between the paired CRC encoder/decoder 211-1 and CRC encoder/decoder 211-2, the security encoder 217-1 paired with the security decoder 217-2, the authentication encoder 218-1 paired with the authentication decoder 218-2, the CRC encoder 213-1 paired with the CRC decoder 213-2, and the RAID encoder 214-1 paired with the RAID decoder 214-2. A pair of security encoder/decoder 217, a pair of authentication encoder/decoder 218, a pair of CRC encoder/decoder 213, a pair of RAID encoder/decoder 214 can be analogous to a pair of security encoder/decoder 217, a pair of authentication encoder/decoder 218, a pair of CRC encoder/decoder 213, a pair of RAID 214 illustrated in FIG. 2A. Although not illustrated in FIG. 2B, the RAID decoder 214-2 can further include a CRC decoder that provides the same functionality as the CRC decoder 213-2, but to perform an error detection operation (e.g., to CRC-check) on data subsequent to the RAID process.

The back end portion 219 can include media controllers 221-1, . . . , 221-X. The back end portion 219 can further include PHY memory interfaces 224-1, . . . , 224-X configured to be coupled to memory devices 226-1, . . . , 226-N via channels 225-1, . . . , 225-N.

FIG. 2B is analogous to FIG. 2A, except that it includes additional circuitry to check any errors on the UDB using CRC data without transferring/storing the CRC to the memory device 226. For example, as illustrated in FIG. 2B, the FCRC decoder 211-1-2 coupled between the cache 212 and the security encoder 217-1 (and/or the authentication encoder 218-1) can be configured to check any errors on an UDB stored in the cache 212 using error detection information (e.g., CRC data) generated at the FCRC encoder 211-1-1. The FCRC encoder 211-2-1 coupled between the cache 212 and the security decoder 217-2 (and/or the authentication decoder 218-2) can be configured generate error detection information (e.g., CRC data) on an UDB to be transferred to the host (e.g., the host 103 illustrated in FIG. 1). The error detection information generated at the FCRC encoder 211-2-1 can be used at the FCRC decoder 211-2-2 to check any errors on an UDB transferred from the cache 212.

In some embodiments, the pairs of CRC encoder/decoder 211-1 and 211-2 can be used just to check errors on data stored in the cache. Accordingly, error detection information (e.g., CRC data) used at the pairs 211-1 and 211-2 may not be transferred and written to the memory devices 226.

Figure 3A:
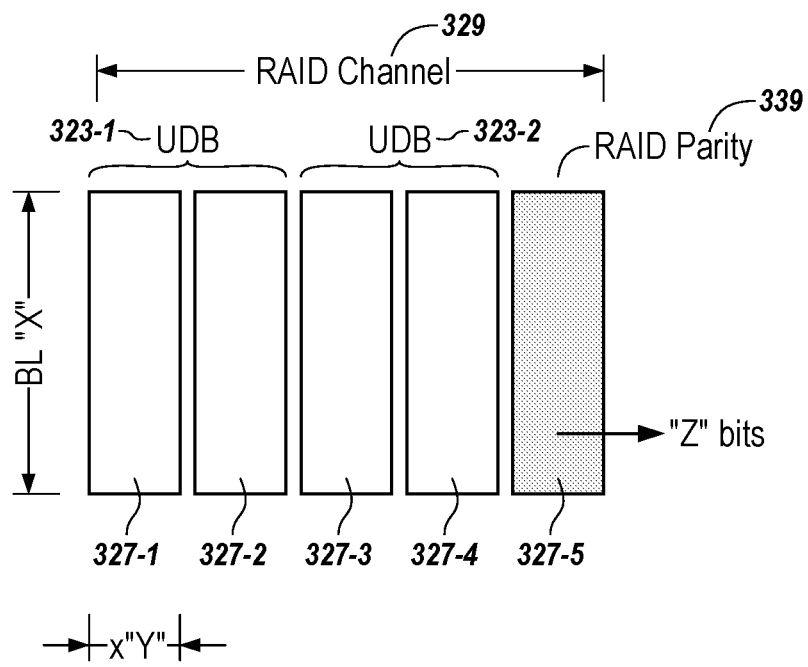
FIG. 3A is a block diagram of memory dice corresponding to a data protection channel in accordance with a number of embodiments of the present disclosure.

FIG. 3A is a block diagram of memory dice corresponding to a number of data protection channels (e.g., RAID channels) in accordance with a number of embodiments of the present disclosure. The diagram illustrates five memory dice 327-1, . . . , 327-5 that can be analogous to memory dice 227.

Each memory die 327 can include a number of data pins having different types, such as DQ pins and DMI pins. For each memory die 327, data can be exchanged over X-bit burst length (e.g., transferred to or from the memory die 327) via DMI pins at a rate of Y bits per beat and via DQ pins at a rate of Z bits per beat. In one example, each memory die 327 can include 8 DQ pins and 1 DMI pin such that data are transferred at a rate of 8 bits per beat via 8 DQ pins and at a rate of 1 bit per beat via 1 DMI pin over 16-bit burst length.

Although embodiments are not so limited, two memory dice 327 can correspond to (e.g., a channel width) of the channel 125 and/or 225 illustrated in FIGS. 1 and 2, respectively. For example, memory dice 327-1 and 327-2 can correspond to one channel 125, 225; memory dice 327-3 and 327-4 can correspond to another channel 125, 225; and memory die 327-5 can correspond to (a half of) a different channel 125, 225. Accordingly, each channel 125, 225 can be 2*Y-bit wide (e.g., 16-bit wide).

The memory dice 327-1, . . . , 327-5 can correspond to a same memory rank of memory device (e.g., the memory devices 126 and/or 226 illustrated in FIGS. 1 and 2). As used herein, the term "memory ranks" generally refers to a plurality of memory chips (e.g., memory dice) that can be accessed simultaneously. Accordingly, memory dice 327-1, . . . , 327-55 can be accessed simultaneously (e.g., "substantially simultaneously" as defined herein).

The diagram shows four memory dice 327-1, . . . , 327-4 (of RAID channel 329) over which UDBs 323-1 and 323-2 (corresponding to a same MTB) can be stored, although embodiments are not limited to a particular quantity of memory dice over which a single UDB can be stored. For example, the UDB 323-1 can be stored over the memory dice 327-1 and 327-2, while the UDB 323-2 can be stored over the memory dice 327-3 and 327-4 as illustrated in FIG.

3. In a particular example, given that each UDB is 64 bytes, each memory die 327 can be configured to store 32 bytes. The UDBs 323 can be exchanged via DQ pins of the respective memory dice 323.

The memory dice 327-1, . . . , 327-4 can further store and transfer auxiliary data (e.g., 20 bits) via one or more DMI pins. The auxiliary data that can be transferred from the memory dice 327-1, . . . , 327-8 via DMI pins over the X-bit burst length (e.g., over 32-bit burst length) can include (e.g., 28 bits of) authentication data (e.g., MAC generated at the authentication encoder 218-1 illustrated in FIG. 2), (e.g., 45 bits) error detection data (e.g., including 7 bits of FCRC data for each UDB 323 and generated at the CRC encoder 211-1 and 31 bits of CRC data generated at the CRC encoder 213-1), (e.g., 1 bit of) TEE data, and (e.g., 6 bits of) metadata (e.g., with 3 bits for each UDB 323), which amounts to 80 bits of auxiliary data. In some embodiments, 10 bits of ECC data (e.g., for a link ECC operation) and/or 2 bits for indicating a result (e.g., "no errors", "a single bit error", "two bit errors", or "more than two bit errors") of the on-die ECC operation performed on each subset (corresponding to a respective memory die 327) can be optionally transferred via the DMI pins over the X-bit burst length.

The diagram further shows a memory die 327-5, in which a PDB 339 including RAID parity data (e.g., generated at a RAID encoder 214-1) can be stored, although embodiments are not limited to a particular quantity of memory dice over which a PDB can be stored.

Data (e.g., PDB and MTB including UDBs) stored in the memory dice 327-1, . . . , 327-5 can also be a data transfer unit between the memory devices (e.g., the memory devices 126 and/or 226 illustrated in FIGS. 1 and 2) and the memory controller (e.g., the memory controller 100 and/or 200 illustrated in FIGS. 1 and 2). For example, UDBs 323 as well as auxiliary data 337 and an PDB 339 can be transferred together in response to a host read command to access the one of the UDBs 323.

The memory dice 327-1, . . . , 327-5 can correspond to a data protection channel, such as a RAID channel 329; therefore, the RAID channel 329 can be 5*Y-bit wide (corresponding to five memory dice 327) and "4+1" RAID channel, which indicates that there are four memory dice configured for one or more UDBs and one memory die for one or more PDBs, which results in an overhead of 25% (e.g., ¼=25%). The memory system (e.g., the memory system 101) can include a number of RAID channels (e.g., each corresponding to the RAID channel 329).

Figure 3B:
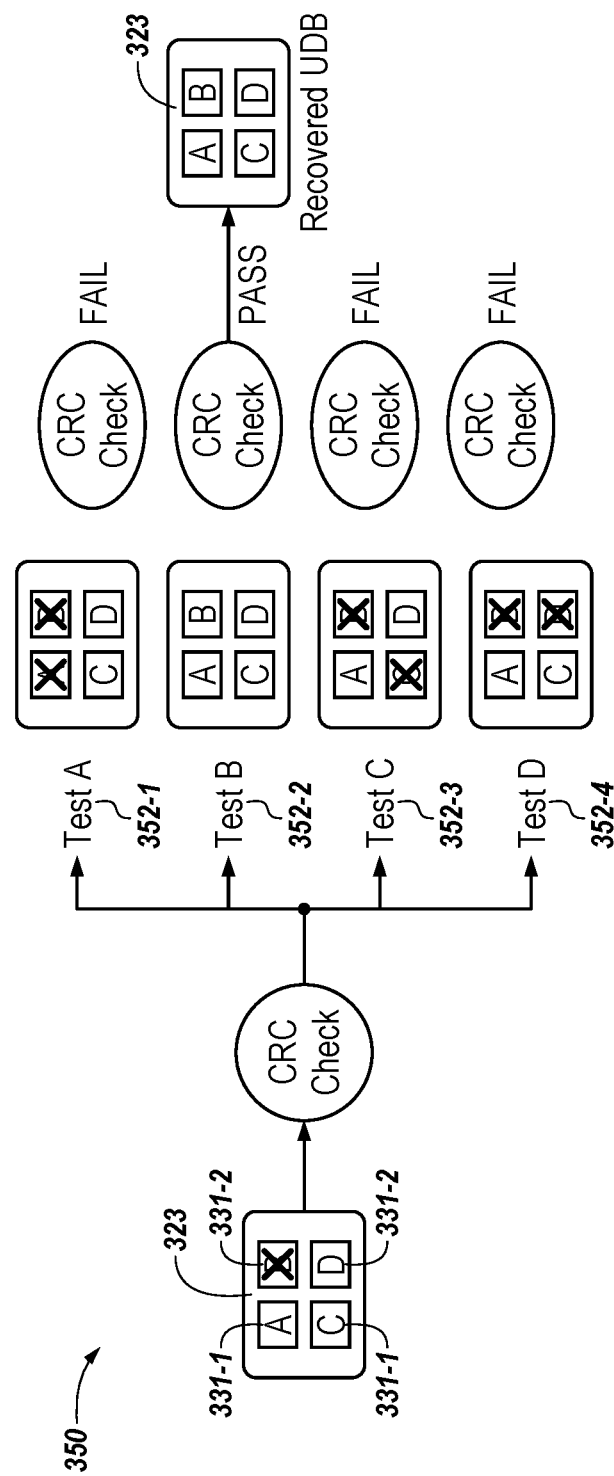
FIG. 3B is a block diagram schematically illustrating a locked-RAID process for data protection of subsets of a user data block (UDB) in accordance with a number of embodiments of the present disclosure.

FIG. 3B is a block diagram 450 schematically illustrating a locked-RAID process for data protection of subsets of an UDB 323 in accordance with a number of embodiments of the present disclosure. The UDB 323 can be analogous to the UDB 323 illustrated in FIG. 3.

As illustrated in FIG. 3B, the UDB 323 includes nine data subsets (alternatively referred to as "subsets" herein), such as subsets 354-1 (subset "A" shown in FIG. 3B), 354-2 (subset "B" shown in FIG. 3B), 354-3 (subset "C" shown in FIG. 3B), 354-4 (subset "D" shown in FIG. 3B) illustrated in FIG. 3B can respectively correspond to memory dice (e.g., the memory dice 327-1, . . . , 327-4 illustrated in FIG. 3A) of a RAID channel (e.g., the RAID channel 329 illustrated in FIG. 3A) that can be error-recovered using a PDB (e.g., the PDB 339 illustrated in FIG. 3A).

FIG. 3B illustrates an example scenario, in which the subset "B" includes one or more errors that caused a failure of a CRC check (e.g., alternatively referred to as an error detection operation) performed at the CRC decoder (e.g., the CRC decoder 213-2 illustrated in FIGS. 2A and/or 2B, respectively). At the RAID decoder 214-2, one or more RAID operations are performed (e.g., in serial or in parallel) on four different combinations/scenarios, as further described below.

For example, a RAID operation 352-1 (shown as "TEST A" in FIG. 3B) is performed based on postulation that the subset "A" has caused the failure of the CRC check; a RAID operation 352-2 (shown as "TEST B" in FIG. 3B) is performed based on postulation that the subset "B" has caused the failure of the CRC check; a RAID operation 352-3 (shown as "TEST C" in FIG. 3B) is performed based on postulation that the subset "C" has caused the failure of the CRC check; and a RAID operation 352-4 (shown as "TEST D" in FIG. 3B) is performed based on postulation that the subset "D" has caused the failure of the CRC check.

The UDBs 323 with the RAID operations 352 performed can be respectively checked for errors (e.g., via respective CRC checks). As illustrated in FIG. 3B, the UDB 323 with the RAID operation 352-2 passes the CRC check because the RAID operation 352-2 performed to recover the subset "B" correctly recovered the UDB 323, while the other RAID operations 352-1, 352-3 and 352-4 missed to recover the subset "D", but rather further causes errors in respective subsets 354-1, 354-3, and 354-4.

The RAID operations 352 can be performed in various manners in conjunction with one or more CRC checks. In one example, the RAID operations 352 are performed sequentially with a respective CRC check performed subsequent to each RAID operation. For example, the RAID operations 352 can be performed in a sequence of 352-1 and 352-2 with two CRC checks performed subsequent to each RAID operations 352-1 and 352-2. Since the CRC check performed subsequent to the RAID operation 352-2 will say "pass" (e.g., no errors in the subsets 431), the RAID process is completed and the RAID operations 352-3 and 352-4 need not be performed. In another example, the RAID operations 352 are performed in parallel on (e.g., copies of) the subsets 354-1, . . . , 354-4. In this example, the CRC checks are performed respectively for the RAID operations 352 and the copy of the UDB 323 (on which the RAID operation 352-2 is performed) with "pass" will be further transferred to the security decoder (e.g., the security decoder 217-2 illustrated in FIGS. 2A and/or 2B).

In a non-limiting example, an apparatus (e.g., the memory device 126 and/or 226 illustrated in FIGS. 1, 2A, and 2B) can include a plurality of memory units (e.g., the memory dice 227, 327, and/or 427 illustrated in FIGS. 2A, 2B, 3, and 4). Each memory unit of the plurality of memory units can include a respective array of memory cells (e.g., the array 220 illustrated in FIGS. 2A and 2B) that is configured to store a respective portion of one or more user data blocks (UDBs) (e.g., the UDBs 323 and 423 illustrated in FIGS. 3 and 4) and auxiliary data corresponding to the respective portion of the one or more UDBs. A first portion of the auxiliary data can include error correction information (e.g., on-die ECC data generated at the respective intra-controller 228 illustrated in FIGS. 2A and 2B) corresponding to the respective portion of the one or more UDBs. A respective intra-controller (e.g., the intra-controller 228 illustrated in FIGS. 2A and 2B) can be configured to, in response to receipt of a command to access the respective portion of the one or more UDBs, perform an error correction operation (e.g., ECC operation) on the respective portion of the one or more UDBs using the error correction information to correct one or more bit errors on the respective portion of the one or more UDBs. The respective intra-controller can be further configured to exchange, subsequent to performance of the error correction operation and via one or more data pins (e.g., DQ and DMI pins) of the respective memory unit, the respective portion of the one or more UDBs and a second portion of the auxiliary from the respective memory unit.

In some embodiments, the respective intra-controller can be further configured to exchange a result of the error correction operation. In some embodiments, the error correction information can correspond to first error correction information. In this example, the respective intra-controller can be further configured to exchange, via the one or more data pins of the respective memory unit, second error correction information (e.g., generated at the memory controller 100 and/or 200 illustrated in FIGS. 1, 2A, and 2B) corresponding to the respective portion of the one or more UDBs. The respective intra-controller can be configured exchange the second error correction information via the one or more data pins of the respective memory unit without exchanging the first error correction information.

In some embodiments, each memory unit can correspond to a memory die. Each intra-controller of the plurality of intra-controllers can correspond to an on-die controller located on a same memory die as the respective array of memory cells.

In some embodiments, the respective intra-controller can be configured to exchange the respective portion of the one or more UDBs via a plurality of data input/output (DQ) pins of the one or more data pins of the respective memory unit. The respective intra-controller can be further configured to exchange the auxiliary data via one or more data mask inversion (DMI) pins of the one or more data pins of the respective memory unit.

In some embodiments, the second portion of the auxiliary data further can include a respective portion of cyclic redundancy check (CRC) data (e.g., CRC data generated at the CRC encoder 213-1 illustrated in FIGS. 2A and 2B) to indicate one or more bit errors in the one or more UDBs. In some embodiments, the second portion of the auxiliary data further can include a respective portion of cyclic redundancy check (CRC) data (e.g., CRC data generated at the CRC encoder 211-1 illustrated in FIG. 2A) to indicate one or more bit errors in a respective UDB of the one or more UDBs. In some embodiments, the second portion of the auxiliary data further can include authentication data (e.g., MAC data generated at the authentication encoder 218-1) to check data integrity and authenticity of the one or more UDBs.

Figure 4A:
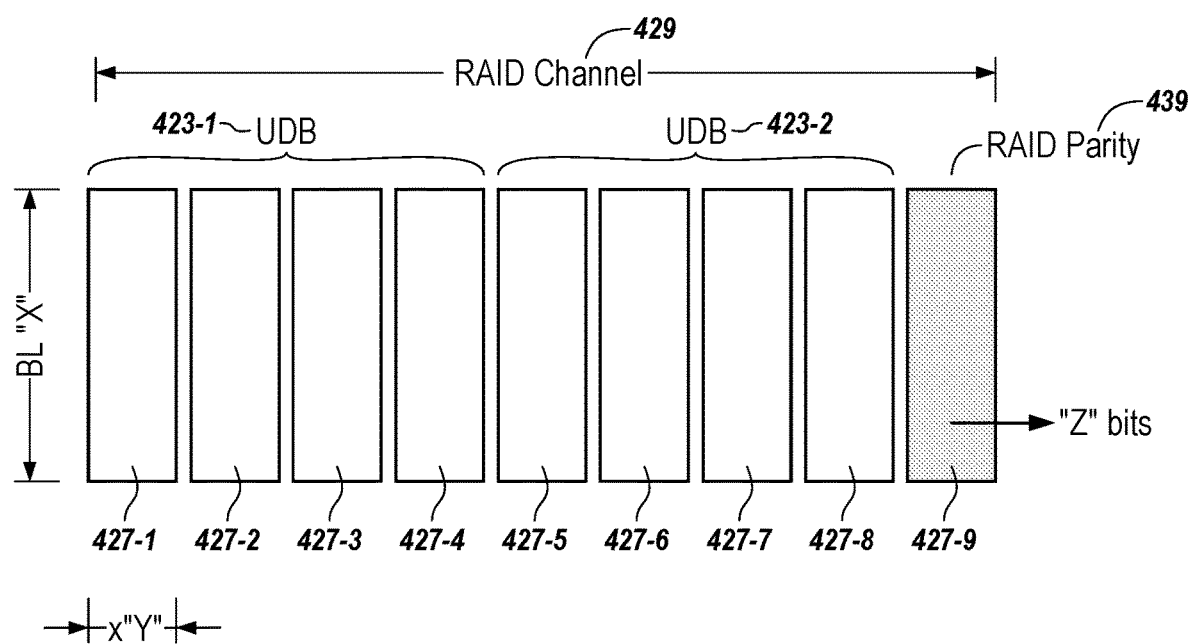
FIG. 4A is another block diagram of memory dice corresponding to a data protection channel in accordance with a number of embodiments of the present disclosure.

FIG. 4A is a block diagram of memory dice corresponding to a number of data protection channels (e.g., RAID channels) in accordance with a number of embodiments of the present disclosure. The diagram illustrates nine memory dice 427-1, . . . , 427-9 that can be analogous to memory dice 227.

Each memory die 427 can include a number of data pins having different types, such as DQ pins and DMI pins. For each memory die 427, data can be exchanged over X-bit burst length (e.g., transferred to or from the memory die 427) via DMI pins at a rate of Y bits per beat and via DQ pins at a rate of Z bits per beat. In one example, each memory die 427 can include 8 DQ pins and 1 DMI pin such that data are transferred at a rate of 8 bits per beat via 8 DQ pins and at a rate of 1 bit per beat via 1 DMI pin over 16-bit or 32-bit burst length.

Although embodiments are not so limited, two memory dice 427 can correspond to (e.g., a channel width) of the channel 125 and/or 225 illustrated in FIGS. 1 and 2, respectively. For example, memory dice 427-1 and 427-2 can correspond to one channel 125, 225; memory dice 427-3 and 427-4 can correspond to another channel 125, 225; memory dice 427-5 and 427-6 can correspond to a different channel 125, 225; memory dice 427-7 and 427-8 can correspond to a different channel 125, 225; and memory die 427-9 can correspond to (a half of) a different channel 125, 225. Accordingly, each channel 125, 225 can be 2*Y-bit wide (e.g., 16-bit wide).

The memory dice 427-1, . . . , 427-9 can correspond to a same memory rank of memory device (e.g., the memory devices 126 and/or 226 illustrated in FIGS. 1 and 2). Accordingly, memory dice 427-1, . . . , 427-9 can be accessed simultaneously (e.g., "substantially simultaneously" as defined herein).

The diagram shows eight memory dice 427-1, . . . , 427-9 (of RAID channel 429) over which UDBs 423-1 and 423-2 (that can correspond to an MTB) can be stored, although embodiments are not limited to a particular quantity of memory dice over which a single UDB can be stored. For example, the UDB 423-1 can be stored over the memory dice 427-1, . . . , 427-4, while the UDB 423-2 can be stored over the memory dice 427-5 and 427-8 as illustrated in FIG. 4A. In a particular example, given that each UDB is 64 bytes, each memory die 427 can be configured to store 16 bytes (transferrable over 16-bit burst length), the UDB 423 (423-1 or 423-2) can be 64 bytes. The UDBs 423 can be exchanged via DQ pins of the respective memory dice 423.

Figure 4B:
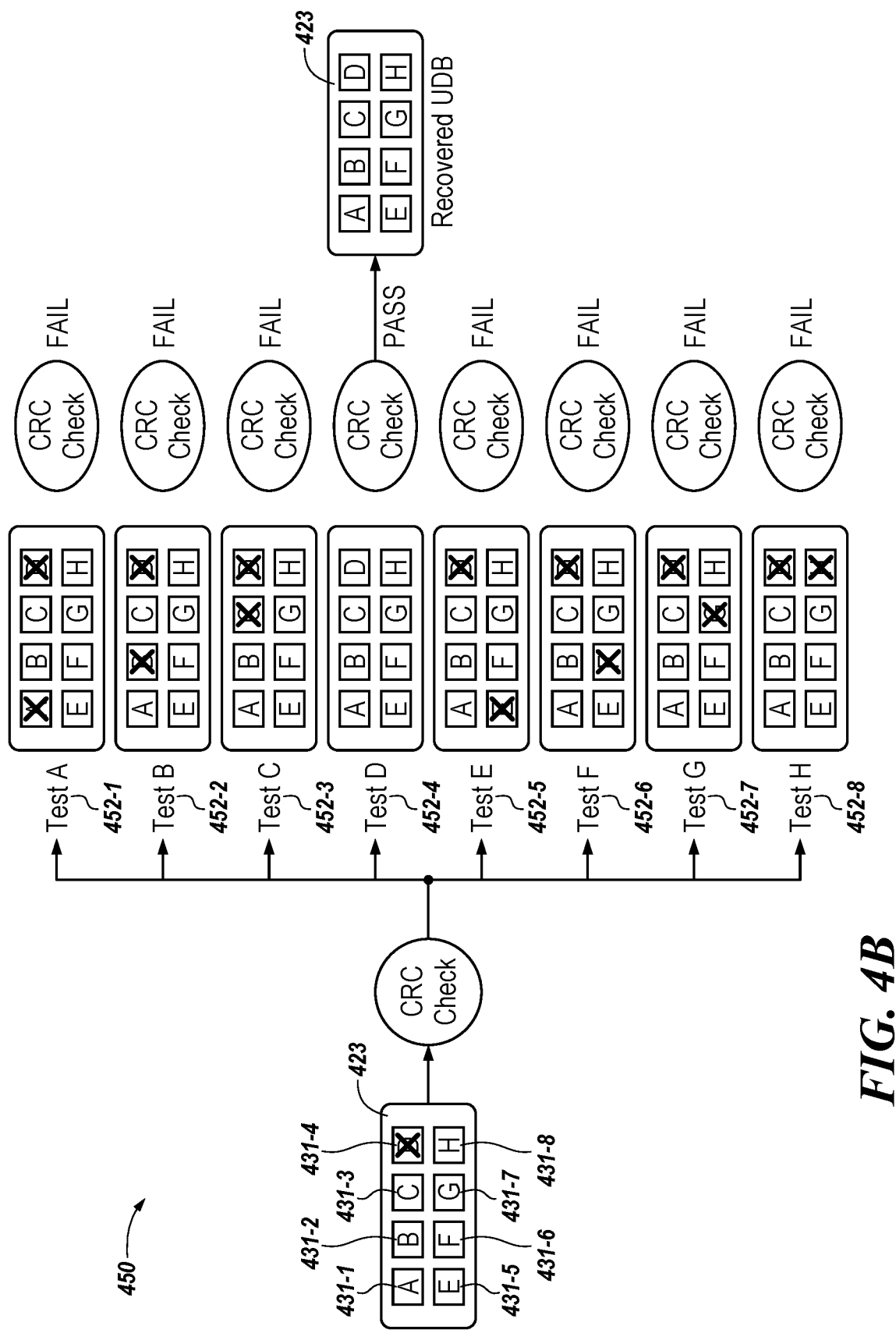
FIG. 4B is a block diagram schematically illustrating a locked-RAID process for data protection of subsets of an UDB in accordance with a number of embodiments of the present disclosure.

Each memory die (e.g., memory die 427) is not illustrated in its entirety in FIG. 4B and can further include other portions that are not illustrated in FIG. 4B. For example, each memory die 427 can be a size of 32 bytes of which 16 bytes are exhausted for the UDB 423-1 or 423-2 and the other 16 bytes are exhausted for the other UDB corresponding to a different MTB than the UDB 423-1 or 423-2. In this example, data stored in the memory dice 427 can be entirely transferred (over a 32-bit burst length) to the memory controller 200 (in response to a host read command) and the transferred UDBs that do not correspond to the host read command can be discarded at the memory controller 200.

The memory dice 427-1, . . . , 427-8 can further store and transfer auxiliary data (e.g., 10 bits) via one or more DMI pins. For example, each memory die 427 can be configured to store 10 bits of auxiliary data. The auxiliary data that can be transferred from the memory dice 427-1, . . . , 427-8 via DMI pins over the X-bit burst length (e.g., over 16-bit burst length) can include (e.g., 28 bits of) authentication data (e.g., MAC generated at the authentication encoder 218-1 illustrated in FIG. 2), (e.g., 45 bits) error detection data, including 7 bits of FCRC data for each UDB 423 and generated at the CRC encoder 211-1 and 31 bits of CRC data generated at the CRC encoder 213-1), (e.g., 1 bit of) TEE data, and (e.g., 6 bits of) metadata (e.g., with 3 bits for each UDB 423), which amounts to 80 bits of auxiliary data. In the event that the link ECC mechanism is enabled such that link ECC data need to be transferred via DMI pins as well, the auxiliary data stored that can be transferred from the memory dice 427-1, . . . , 427-8 via DMI pins over the X-bit burst length (e.g., over 16-bit burst length) can include (e.g., 28 bits of) authentication data (e.g., MAC generated at the authentication encoder 218-1 illustrated in FIG. 2), (e.g., 29 bits of) error detection data (CRC data generated at the CRC encoder 213-1 illustrated in FIG. 2B), (e.g., 1 bit of) TEE data, and (e.g., 6 bits of) metadata (e.g., with 3 bits for each UDB 423), which amounts to 64 bits of auxiliary data.

The diagram further shows a memory die 427-9, in which a PDB 439 including RAID parity data (e.g., generated at a RAID encoder 214-1) can be stored, although embodiments are not limited to a particular quantity of memory dice over which a PDB can be stored.

Data (e.g., PDB and MTB including UDBs) stored in the memory dice 427-1, . . . , 427-9 can also be a data transfer unit between the memory devices (e.g., the memory devices 126 and/or 226 illustrated in FIGS. 1 and 2) and the memory controller (e.g., the memory controller 100 and/or 200 illustrated in FIGS. 1 and 2). For example, UDBs 423 as well as auxiliary data 437 and an PDB 439 can be transferred together in response to a host read command to access one of the UDBs 423.

The memory dice 427-1, . . . , 427-9 can correspond to a data protection channel, such as a RAID channel 429; therefore, the RAID channel 429 can be 9*Y-bit wide (corresponding to five memory dice 427) and "8+1" RAID channel, which indicates that there are eight memory dice configured for one or more UDBs and one memory die for one or more PDBs, which results in an overhead of 12.5% (e.g., ⅛=12.5%). The memory system (e.g., the memory system 101) can include a number of RAID channels (e.g., each corresponding to the RAID channel 429).

FIG. 4B is a block diagram 450 schematically illustrating a locked-RAID process for data protection of subsets of an UDB 423 in accordance with a number of embodiments of the present disclosure. The UDB 423 illustrated in FIG. 4B can be analogous to the UDB 423 illustrated in FIG. 4A.

FIG. 4B is analogous to FIG. 3B except that RAID operations 452 are performed on an UDB 423 having eight subsets 454-1 (subset "A" shown in FIG. 4B), 454-2 (subset "B" shown in FIG. 4B), 454-3 (subset "C" shown in FIG. 4B), 454-4 (subset "D" shown in FIG. 4B), 454-5 (subset "E" shown in FIG. 4B), 454-6 (subset "F" shown in FIG. 4B), 454-7 (subset "G" shown in FIG. 4B), and 454-8 (subset "H" shown in FIG. 4B) illustrated in FIG. 4B. The subsets 454-1, . . . , 454-8 can respectively correspond to memory dice (e.g., the memory dice 427-1, . . . , 427-8 illustrated in FIG. 4A) of a RAID channel (e.g., the RAID channel 429 illustrated in FIG. 4A) that can be error-recovered using a PDB (e.g., the PDB 439 illustrated in FIG. 4A)).

FIG. 4B illustrates an example scenario, in which the subset "D" includes one or more errors that caused a failure of a CRC check (e.g., alternatively referred to as an error detection operation) performed at the CRC decoder (e.g., the CRC decoder 213-2 illustrated in FIGS. 2A and/or 2B, respectively). Similar to the RAID operations 352 described in connection with FIG. 3B, the RAID operations 452 can be also performed in various manners in conjunction with one or more CRC checks. In one example, the RAID operations 452 are performed sequentially with a respective CRC check performed subsequent to each RAID operation. For example, the RAID operations 452 can be performed in a sequence of 452-1 to 452-4 with four CRC checks performed subsequent to each RAID operations 452-1, 452-2, 452-3, and 452-4. Since the CRC check performed subsequent to the RAID operation 452-4 will say "pass" (e.g., no errors in the subsets 454), the RAID process is completed and the RAID operations 452-5, . . . , 452-9 need not be performed. In another example, the RAID operations 452 are performed in parallel on (e.g., copies of) the subsets 454-1, . . . , 454-9. In this example, the CRC checks are performed respectively for the RAID operations 452 and the copy of the UDB 423 (with the RAID operation 452-4 performed) with "pass" will be further transferred to the security decoder (e.g., the security decoder 217-2 illustrated in FIGS. 2A and/or 2B).

In another non-limiting example, an apparatus (e.g., the memory device 126 and/or 226 illustrated in FIGS. 1, 2A, and 2B) can include a plurality of memory units (e.g., the memory dice 227, 327, and/or 427 illustrated in FIGS. 2A, 2B, 3, and 4) configured to store error detection information (e.g., CRC data generated at the CRC encoder 213-1 illustrated in FIGS. 2A and 2B) corresponding to one or more user data blocks (UDBs). Each memory unit of the plurality of memory units can include an array of memory cells (e.g., the array 220 illustrated in FIGS. 2A and 2B) configured to store a respective portion of the one or more UDBs (e.g., the UDBs 323 and 423 illustrated in FIGS. 3 and 4). The array of memory cells is configured to store auxiliary data including respective first error correction information (e.g., on-die ECC data generated at the respective intra-controller 228 illustrated in FIGS. 2A and 2B) and a respective portion of the error detection information corresponding to the respective portion of the one or more UDBs (e.g., CRC data generated at the CRC encoder 211-1 and/or 213-1 illustrated in FIGS. 2A and 2B). Each memory unit of the plurality of memory units can further include an intra-controller (e.g., the intra-controller 228 illustrated in FIGS. 2A and 2B) configured to generate the respective first error correction information based on the respective portion of the one or more UDBs. The apparatus can further include a memory controller (e.g., the memory controller 100 and/or 200 illustrated in FIGS. 1, 2A, and 2B) communicatively coupled to the plurality of memory units. The memory controller can be configured to cause a respective intra-controller of the plurality of respective intra-controllers of a first memory device (e.g., the memory device 126 and/or 226 illustrated in FIGS. 1, 2A, and 2B) of the plurality of memory devices to, in response to receipt of a host read command to access the first memory device, perform, using the respective first error correction information, an error correction operation (e.g., ECC operation) on the respective portion of the one or more UDBs. The respective intra-controller can be further configured to transfer, subsequent to the performance of the error correction operation, the respective portion of the one or more UDBs and the auxiliary data including the respective error detection information to the memory controller.

In some embodiments, the plurality of memory units can further include a number of first memory units (e.g., the memory dice 327-1, . . . , 327-4 and/or 427-1, . . . , 427-8 illustrated in FIGS. 3 and 4) configured to store the one or more UDBs and one or more second memory units configured to store redundancy array of independent disks (RAID) parity data (e.g., the PDB 339 and/or 439 illustrated in FIGS. 3 and 4) corresponding to the respective portion of the one or more UDBs. In this example, the memory controller can be configured to perform an error detection operation (e.g., CRC check) on the one or more UDBs using the error detection information. The memory controller can be further configured to perform a RAID operation on the respective portion of the one or more UDBs in response to the error detection operation indicating one or more bit errors in the respective portion of the one or more UDBs.

In some embodiments, the array of memory cells can be further configured to store respective second error correction information generated at the memory controller and corresponding to the respective portion of the one or more UDBs. The memory controller can be configured to cause the respective intra-controller to transfer the second correction information to the memory controller. In some embodiments, the memory controller can be configured to perform an error correction operation (e.g., ECC operation) on the respective portion of the one or more UDBs using the respective second error correction information to correct one or more bit errors on the respective portion of the one or more UDBs.

In some embodiments, the memory controller can be configured to cause perform an error detection operation (e.g., CRC check) on the respective portion of the one or more UDBs using the error detection information. The memory controller can be further configured to cause, in response to the error detection operation indicating one or more bit errors in the one or more UDBs, the respective intra-controller to retransfer the respective portion of the one or more UDBs to the memory controller for a number of times.

Continuing with this example, the memory controller can be configured to correct, in response to the retransfer of the second correction information and the respective portion of the one or more UDBs, an amount of bit errors in the one or more UDBs based on comparison of data patterns among copies of the one or more UDBs transferred during the number of retransfers. In this example, the memory controller can be configured to correct the amount of errors based on a match by a majority of the data patterns.

Continuing further with this example, the memory controller can be configured to perform an error detection operation on the respective portion of the one or more UDBs using the error detection information. The memory controller can be further configured to perform a RAID operation on the respective portion of the one or more UDBs in response to the error detection operation indicating one or more bit errors in the respective portion of the one or more UDBs.

Figure 5:
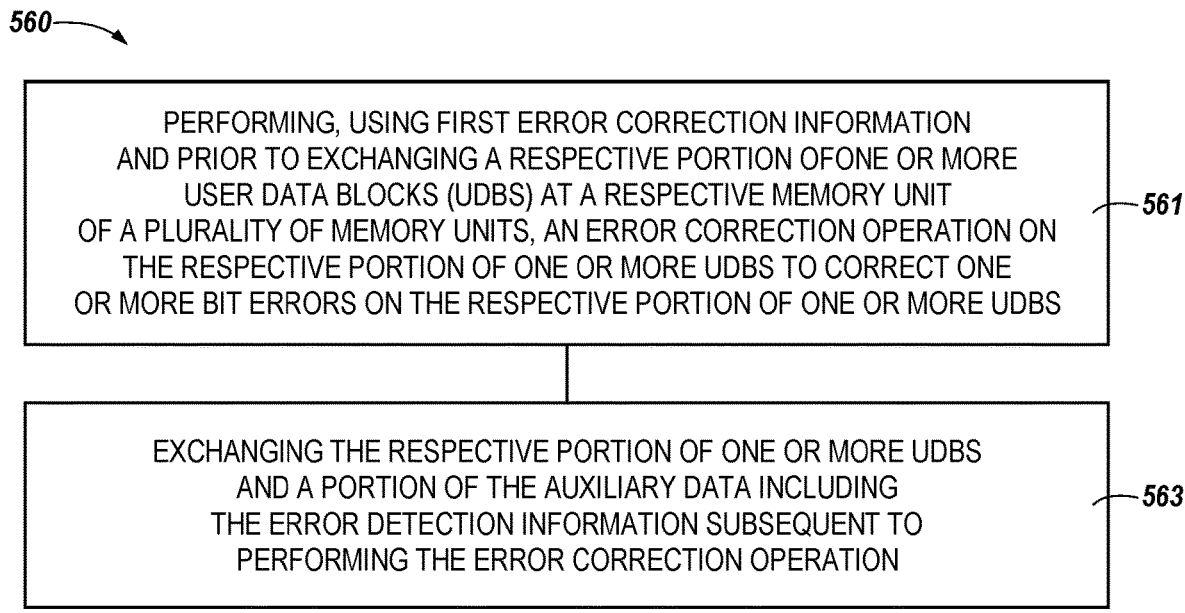
FIG. 5 is a flow diagram of a method for performing an error correction code (ECC) operation at an intra-controller in accordance with a number of embodiments of the present disclosure.

FIG. 5 is a flow diagram of a method 560 for performing an ECC operation at an intra-controller in accordance with a number of embodiments of the present disclosure. The method 560 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 560 is performed by the intra-controller 228 illustrated in FIGS. 2A and 2B or memory controller 100 and/or 200 illustrated in FIGS. 1, 2A, and 2B, respectively. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At 561, an error correction operation (e.g., ECC operation) can be performed on a respective portion of one or more UDBs (e.g., the UDBs 323 and 423 illustrated in FIGS. 3 and 4) using first error correction information (e.g., on-die ECC data generated at the intra-controller 228 illustrated in FIGS. 2A and 2B) and prior to exchanging the respective portion of one or more user data blocks (UDBs) at a respective memory unit of a plurality of memory units (e.g., the memory dice 227, 327, and/or 427 illustrated in FIGS. 2A, 2B, 3, and 4) to correct one or more bit errors on the respective portion of one or more UDBs. Each memory unit of the plurality of memory units can be configured to store the respective portion of one or more UDBs. Each memory units can be further configured to store auxiliary data comprising the first error correction information and error detection information (e.g., CRC data generated at the CRC encoder 211-1 and/or 213-1 illustrated in FIGS. 2A and 2B) to indicate one or more bit errors in the one or more UDBs.

At 563, the respective portion of one or more UDBs and a portion of the auxiliary data including the error detection information can be exchanged subsequent to performing the error correction operation. In some embodiments, second error correction information (e.g., ECC data generated at the memory controller 100 and/or 200 illustrated in FIGS. 1, 2A, and 2B) can be further exchanged as part of the portion of the auxiliary data.

In some embodiments, a number of bits corresponding to a result of the error correction operation performed on the respective portion of one or more UDBs can be further exchanged. In some embodiments, the respective portion of one or more UDBs and the first portion of the auxiliary data can be exchanged without exchanging the first portion of the auxiliary data.

In some embodiments, the respective portion of the one or more UDBs can be exchanged via one or more data input/output (DQ) pins. The portion of the auxiliary data can be exchanged simultaneously with exchanging the respective portion of the one or more UDBs via one or more data mask inversion (DMI) pins.

Figure 6:
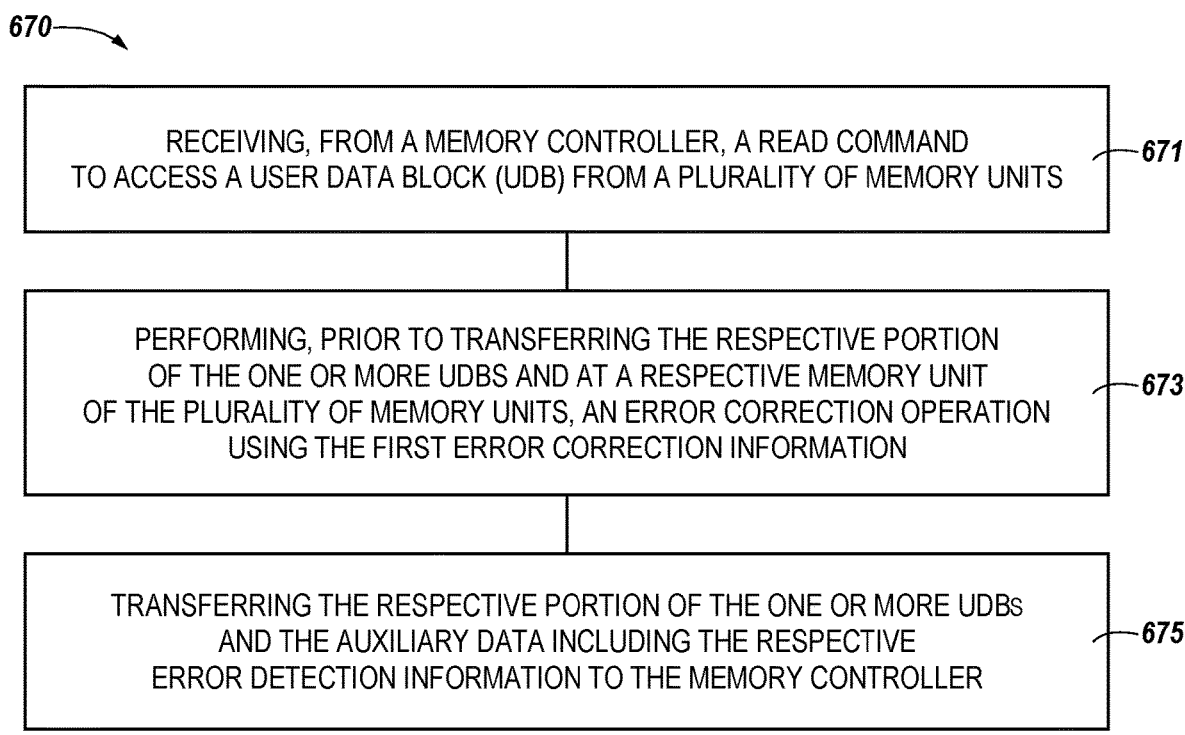
FIG. 6 is a flow diagram of a method for performing an ECC operation at an intra-controller in accordance with a number of embodiments of the present disclosure.

FIG. 6 is a flow diagram of a method 670 for performing an ECC operation at an intra-controller in accordance with a number of embodiments of the present disclosure. The method 670 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 670 is performed by the intra-controller 228 illustrated in FIGS. 2A and 2B or memory controller 100 and/or 200 illustrated in FIGS. 1, 2A, and 2B, respectively. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At 671, a read command to access a user data block (UDB) (e.g., the UDBs 323 and 423 illustrated in FIGS. 3 and 4) from a plurality of memory units (e.g., the memory dice 227, 327, and/or 427 illustrated in FIGS. 2A, 2B, 3, and 4) can be received from a memory controller. Each memory unit of the plurality of memory units configured to store a respective portion of one or more user data blocks (UDBs) (e.g., the UDBs 323 and 423 illustrated in FIGS. 3 and 4). Each memory unit can be further configured to store auxiliary data including respective first error correction information (e.g., on-die ECC data generated at the respective intra-controller 228 illustrated in FIGS. 2A and 2B) and respective error detection information (e.g., CRC data generated at the CRC encoder 211-1 and/or 213-1 illustrated in FIGS. 2A and 2B) corresponding to the respective portion of the one or more UDBs.

In some embodiments, the auxiliary data further can include second error correction information (e.g., link ECC data generated at the memory controller 100 and/or 200 illustrated in FIGS. 1, 2A, and 2B) generated at the memory controller. In this example, an error correction operation (e.g., link ECC operation) can be performed at the memory controller using the second error correction information to correct one or more bits on the respective portion of the one or more UDBs.

At 673, an error correction operation (e.g., on-die ECC operation) can be performed using the first error correction information at a respective memory unit of the plurality of memory units and prior to transferring the respective portion of the one or more UDBs.

At 675, the respective portion of the one or more UDBs and the auxiliary data including the respective error detection information can be transferred to the memory controller. In some embodiments, the respective error detection information can be transferred to the memory controller without transferring the error correction information to the memory controller.

In some embodiments, the respective portion of the one or more UDBs can be transferred via one or more data input/output (DQ) pins. Further, the auxiliary data including the respective error detection information can be transferred via one or more data mask inversion (DMI) pins simultaneously with transferring the respective portion of the one or more UDBs.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
a plurality of memory units, each memory unit of the plurality of memory units further comprising:
a respective array of memory cells configured to store:
a respective portion of one or more user data blocks (UDBs); and
auxiliary data corresponding to the respective portion of the one or more UDBs, wherein a first portion of the auxiliary data comprises error correction information corresponding to the respective portion of the one or more UDBs; and
a respective intra-controller configured to, in response to receipt of a command to access the respective portion of the one or more UDBs:
perform an error correction operation on the respective portion of the one or more UDBs using the error correction information to correct one or more bit errors on the respective portion of the one or more UDBs; and
exchange, subsequent to performance of the error correction operation and via one or more data pins of the respective memory unit, the respective portion of the one or more UDBs and a second portion of the auxiliary from the respective memory unit.

2. The apparatus of claim 1, wherein:
the error correction information corresponds to first error correction information; and
the respective intra-controller is further configured to exchange, via the one or more data pins of the respective memory unit, second error correction information corresponding to the respective portion of the one or more UDBs.

3. The apparatus of claim 2, wherein the respective intra-controller is configured exchange the second error correction information via the one or more data pins of the respective memory unit without exchanging the first error correction information.

4. The apparatus of claim 1, wherein:
each memory unit corresponds to a memory die; and
each intra-controller of the plurality of intra-controllers corresponds to an on-die controller located on a same memory die as the respective array of memory cells.

5. The apparatus of claim 1, wherein the respective intra-controller is configured to:
exchange the respective portion of the one or more UDBs via a plurality of data input/output (DQ) pins of the one or more data pins of the respective memory unit; and
exchange the auxiliary data via one or more data mask inversion (DMI) pins of the one or more data pins of the respective memory unit.

6. The apparatus of claim 1, wherein the second portion of the auxiliary data further comprises a respective portion of cyclic redundancy check (CRC) data to indicate one or more bit errors in a respective UDB of the one or more UDBs.

7. The apparatus of claim 1, wherein the second portion of the auxiliary data further comprises authentication data to check data integrity and authenticity of the one or more UDBs.

8. A method, comprising:
performing, using first error correction information and prior to exchanging a respective portion of one or more user data blocks (UDBs) at a respective memory unit of a plurality of memory units, an error correction operation on the respective portion of one or more UDBs to correct one or more bit errors on the respective portion of one or more UDBs, wherein each memory unit of the plurality of memory units is configured to store:
the respective portion of one or more UDBs; and
auxiliary data comprising the first error correction information and error detection information to indicate one or more bit errors in the one or more UDBs; and
exchanging the respective portion of one or more UDBs and a portion of the auxiliary data including the error detection information subsequent to performing the error correction operation.

9. The method of claim 8, further comprising exchanging second error correction information as part of the portion of the auxiliary data.

10. The method of claim 8, further comprising exchanging a number of bits corresponding to a result of the error correction operation performed on the respective portion of one or more UDBs.

11. The method of claim 8, further comprising exchanging the respective portion of one or more UDBs and the first portion of the auxiliary data without exchanging the first portion of the auxiliary data.

12. The method of claim 8, further comprising:
exchanging the respective portion of the one or more UDBs via one or more data input/output (DQ) pins; and
exchanging, simultaneously with exchanging the respective portion of the one or more UDBs, the portion of the auxiliary data via one or more data mask inversion (DMI) pins.

13. An apparatus, comprising:
a plurality of memory units configured to store error detection information corresponding to one or more user data blocks (UDBs), each memory unit of the plurality of memory units comprising:
an array of memory cells configured to store:
a respective portion of the one or more UDBs; and
auxiliary data including respective first error correction information and a respective portion of the error detection information; and
an intra-controller configured to generate the respective first error correction information based on the respective portion of the one or more UDBs; and
a memory controller communicatively coupled to the plurality of memory units, the memory controller configured to cause a respective intra-controller of the plurality of respective intra-controllers of a first memory device of the plurality of memory devices to, in response to receipt of a host read command to access the first memory device:
perform, using the respective first error correction information, an error correction operation on the respective portion of the one or more UDBs; and
transfer, subsequent to the performance of the error correction operation, the respective portion of the one or more UDBs and the auxiliary data including the error detection information to the memory controller.

14. The apparatus of claim 13, wherein the plurality of memory units further comprises:
a number of first memory units configured to store the one or more UDBs; and
one or more second memory units configured to store redundancy array of independent disks (RAID) parity data corresponding to the respective portion of the one or more UDBs.

15. The apparatus of claim 14, wherein the memory controller is configured to:
perform an error detection operation on the one or more UDBs using the error detection information; and
perform a RAID operation on the respective portion of the one or more UDBs in response to the error detection operation indicating one or more bit errors in the respective portion of the one or more UDBs.

16. The apparatus of claim 13, wherein:
the array of memory cells is further configured to store respective second error correction information generated at the memory controller and corresponding to the respective portion of the one or more UDBs; and
the memory controller is configured to cause the respective intra-controller to transfer the second error correction information to the memory controller.

17. The apparatus of claim 16, wherein the memory controller is configured to perform an error correction operation on the respective portion of the one or more UDBs using the respective second error correction information to correct one or more bit errors on the respective portion of the one or more UDBs.

18. The apparatus of claim 16, wherein the memory controller is configured to:
perform an error detection operation on the respective portion of the one or more UDBs using the error detection information; and
cause, in response to the error detection operation indicating one or more bit errors in the one or more UDBs, the respective intra-controller to retransfer the respective portion of the one or more UDBs to the memory controller for a number of times.

19. The apparatus of claim 18, wherein the memory controller is configured to correct, in response to the retransfer of the second error correction information and the respective portion of the one or more UDBs, an amount of bit errors in the one or more UDBs based on comparison of data patterns among copies of the one or more UDBs transferred during the number of retransfers.

20. The apparatus of claim 19, wherein the memory controller is configured to:
correct the amount of errors based on a match by a majority of the data patterns;
perform an error detection operation on the respective portion of the one or more UDBs using the error detection information; and
perform a RAID operation on the respective portion of the one or more UDBs in response to the error detection operation indicating one or more bit errors in the respective portion of the one or more UDBs.

\* \* \* \* \*